July 15, 1969 B. BIGOT 3,455,649
NOVEL MIXED ALKALI METAL POLYPHOSPHATES AND METHODS OF PREPARING THEM
Filed April 22, 1965
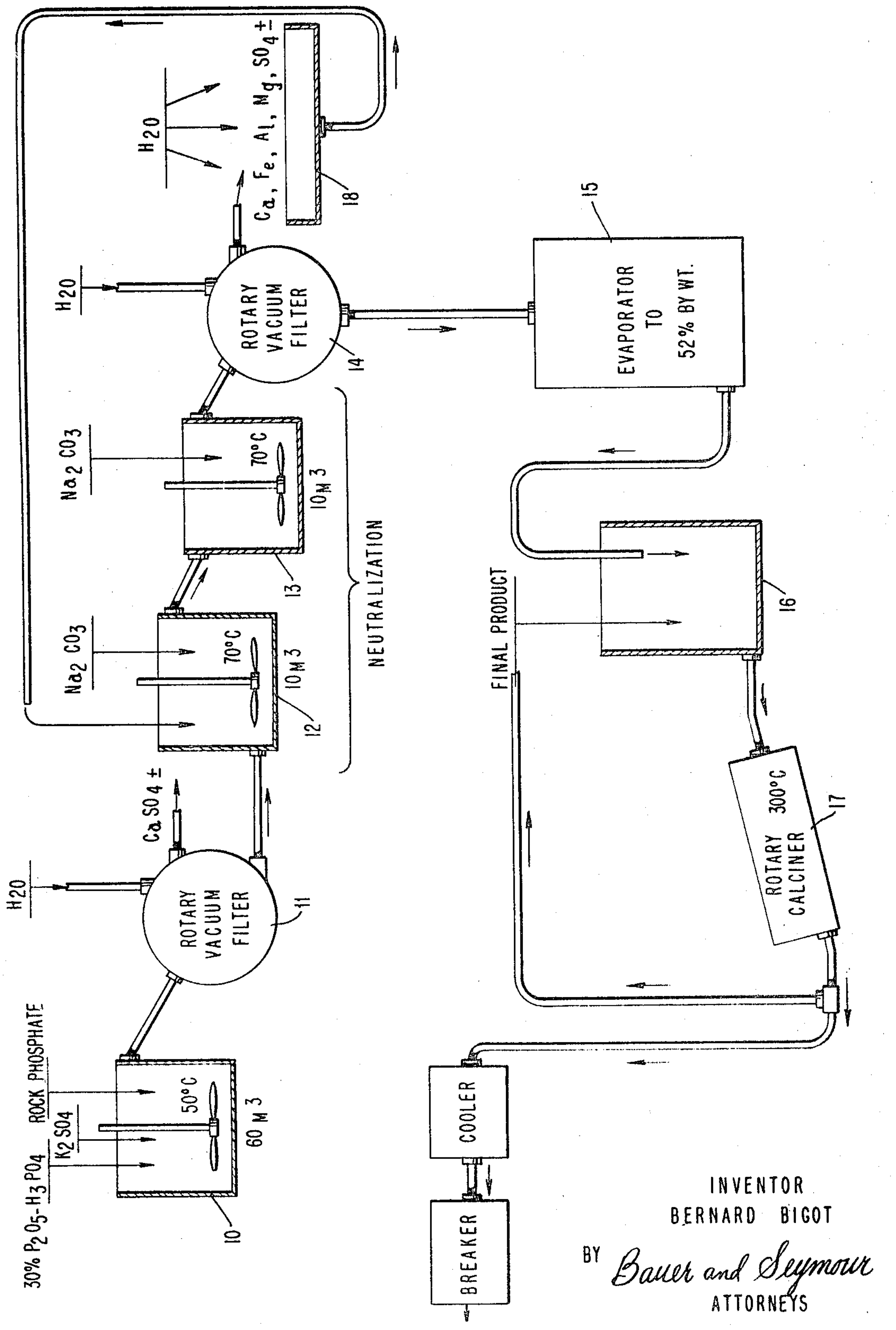
INVENTOR
BERNARD BIGOT
BY Bauer and Seymour
ATTORNEYS United States Patent Office 3,455,649
Patented July 15, 1969

1

3,455,649

NOVEL MIXED ALKALI METAL POLYPHOSPHATES AND METHODS OF PREPARING THEM

Bernard Bigot, Rouen, Seine-Maritime, France, assignor of one-half to Produits Chimiques Pechiney-Saint-Gobain, Paris, France, and one-half to UCB Union Chimique-Chemische Bedrijven, Brussels, Belgium Filed Apr. 22, 1965, Ser. No. 449,945
Claims priority, application France, Apr. 27, 1964, 972,468
Int. Cl. C01b *25/30*
U.S. Cl. 23—107 8 Claims

ABSTRACT OF THE DISCLOSURE

Complex alkali metal polyphosphates for use in the fertilizer industry, in leaching, and as complexants, are made by a process in which phosphate rock is reacted in aqueous medium with phosphoric acid and potassium sulphate, the first intermediate product is reacted with oxygenated alkali metal compounds, usually K and Na compounds, and the second intermediate product is calcined in admixture with some of the final product.

This invention relates to the preparation of mixed polyphosphates of sodium and potassium and to the novel products which are produced thereby.

It is known that the alkali metal salts of polyphosporic anions and especially sodium pyrophosphates ($Na_4P_2O_7$) and sodium tripolyphosphate ($Na_5P_3O_{10}$) are widely used in industry particularly in leaching compounds, complexants, and in the fertilizer industry. Only the sodium salts are generally used at present but it has been proposed to use mixed salts of sodium and potassium having polyphosphoric anions the solubility of which in water is generally greater than the sodium salts. The application of these mixed salts of sodium and potassium has been extremely limited because known methods of preparation are not satisfactory. According to one of those methods certain mixed sodium and potassium polyphosphates are made from an aqueous solution of a polyphosphoric acid containing the desired number of phosphorus atoms and from compositions of sodium and potassium such as the oxides or carbonates. The reaction of the oxygenated sodium and potassium compounds with the selected polyphosphoric acid is unsatisfactory because it requires the use of potassium compounds which are difficult to work with.

According to another prior art method certain mixed sodium and potassium polyphosphates are made by the employment of potassium chloride but that process has a major difficulty in that it requires the total removal of the chlorine ion during the preparation and produces a very corrosive reaction medium.

It is an object of the invention to prepare mixed (Na, K) polyphosphates by a simple and satisfactory process which includes no difficult steps, requirees no difficult separations, and produces no corrosive media.

It is another object of the invention to produce new mixed (Na, K) polyphosphates having wide employment in the fertilizer and leaching industry.

The objects of the invention are accomplished, generally speaking, by a method of making mixed sodium and potassium polyphosphates which comprises reacting phosphate of fertilizer grade in aqueous medium with phosphoric acid and potassium sulphate, separating the precipitate from the liquid, reacting the liquid with sodium carbonate, separating the precipitate from the liquid, concentrating the liquid, mixing the concentrated liquid with final product, and calcining the mixture; and by the

2

$(Na, K)_n$ polyphosphates in which $n$ is between about 4 and about 7, and in which the proportion of K ions to the total alkali metal ions is between about 0.3 and about 0.7.

The applicant has discovered a particularly advantageous process of peparing such mixed compounds, which have the general formula $$P_xO_{3x+1}(Na, K)_{x+2}$$

$x$ being at least 2. This novel process ultilizes phosphates of fertilizer grade such as the natural phosphates of Morocco and Florida and blast furnace slag, as one raw material, the natural phosphate being preferred in many instances. The phosphate is reacted in aqueous medium with phosphoric acid and the sulphate of at least one alkali metal, especially the sulfate of potassium and sodium, the quantity introduced being calculated so as to produce in a first reaction the transformation of dissolved calcium ions, derived from the natural phosphate, into insoluble calcium sulphate. The precipitated calcium sulphate is separated from the reaction mass and the fluid filtrate is partially neutralized by at least one oxygenated alkali metal compound, the oxides, hydroxides, carbonates, and bicarbonates of sodium and potassium being preferred in this step. This partial neutralization is satisfactorily carried to the point where the ratio of total alkali metal ions to the quantity of phosphorus atoms present in the reaction medium satisfies the ratio $$\frac{x+2}{2}$$

$x$ being at least 2. The partly neutralized solution is filtered and the filtrate is concentrated by evaporation of water and the concentrate is calcined, producing a residue of mixed sodium and potassium polyphosphates.

This process is particularly satisfactory when it is applied to the production of mixed (Na, K) polyphosphates having the formula $P_2O_7(Na, K)_4$ which is called the pyrophosphate, and those having the general formula $(Na, K)_5P_3O_{10}$. One does not depart from the scope of the invention by using the process to prepare mixed sodium and potassium polyphosphates which are yet more condensed, for instance the tetra- and penta-polyphosphates of sodium and potassium as well as mixtures in which the sodium and potassium occur in proportions not represented by whole numbers. The process is particularly satisfactory for the preparation of mixed sodium and potassium polyphosphates in which the molecular ratio of potassium ions to all alkali metal ions is between 0.3 and 0.7.

It is advantageous in the novel process to initially react the natural phosphate and the phosphoric acid with potassium sulphate though, in cases where the phosphate contains fluorine, it may be advisable to use a preliminary step in which the fluorine is precipitated by a sodium salt and filtered off before the potassium compound is added.

The new process can be carried out continuously or in successive batches but it is well on the whole to operate continuously, as the continuous process produces advantages of manipulation and result.

Further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing, FIG. 1 is a diagram of the apparatus used in carrying out the process of Example 1, which represents a preferred form of the invention.

In this figure the reaction vat 10 is followed by a rotary vacuum filter 11 and by two reaction vats 12, 13 for a two-step neutralization. A rotary vacuum filter 14 follows the second vat and the fluid from the filter passes to an evaporator 15, the concentrate from which is mixed in a vat 16 with final product from a rotary kiln 17. The solids from filter 14 are washed with water at 18 and the effluent is returned to the vat 12. Some of the final product from the kiln 17 is sent to a cooler and breaker and goes to storage or to use as the case may be.

In the preferred, wholly continous process there are five principal steps:

The first step is carried out in a reaction vat provided with an agitator into which there are admitted, continuously, a solution of phosphoric acid, for instance one containing 25–32% by weight of $P_2O_5$, computed on the weight of the solution; finely divided potassium sulphate preferably in granules smaller than 1 mm.; and the phosphate of fertilizer grade, having a content of calcium phosphate, which is broken up.

In this operation the potassium sulphate is added in such quantity that the molecular ratio of $K_2O$ to $P_2O_5$ is less than 0.5.

As already indicated the quantity of soluble calcium ions employed is calculated so as to transform the sulphate ions in the reaction medium to calcium sulphate. The mean duration of the reactants in the first vat is generally between 2 and 6 hours and the temperature is maintained between about 35° and 55° C. Operating conditions of about 50° C. and an average residence of reactants of about 5 hours are generally satisfactory.

The second step involves separating the solids from the reaction mass as it is discharged from the first step. This separation is conveniently carried out on a continuous filter under vacuum, for instance on a drum or belt filter. The filter cake is washed with water and the effluent from the washing is added to the filtered fluids.

In the third step the liquids from the filter are received in a reaction vat provided with an agitator into which there are poured the oxygenated alkali metal compounds, for example oxides, hydroxides, carbonates, or bicarbonates of sodium or potassium, which are necessary to complete the reactions. These reactants are added at a rate which establishes in the medium the molecular ratio $$\frac{Na+K}{P}$$

at about $$\frac{x+2}{x}$$

being the number of P atoms in the chosen polyphosphate in which there is maintained a molecular ratio of $$\frac{K}{Na+K}$$

between 0.3 and 0.7. Thus, for the preparation of $(Na, K)_4P_2O_7$ there will be maintained in the reaction medium a molar ratio of sodium and potassium to phosphorus about equal to 2, and for the preparation of $(Na, K)_5P_3O_{10}$ the ratio will be about 5:3. During this operation the temperature is generally kept between 50° and 100° C. for an average residence of the reaction mass of 30 minutes to 2 hours. Preferably one operates near 70° C. and the average residence of the reactants in the vat is 45 minutes.

It is advantageous to accomplish the third step in two stages, that is to say in two vats, introducing the alkaline substances into the first vat so as to produce a ratio of alkali metal to phosphorus between about 1 and 1.2, thereafter, in the second of these phases, adding more alkali to raise the molecular ratio of alkali metal to phosphorus to the neighborhood of $$\frac{x+2}{x}$$

In the fourth step the sludge from the third step is subjected to continuous filtration and the filter cake is washed with water.

The fifth step involves the concentration of the filtrate from the fourth step and the calcination of the mixed sodium and potassium salts. In this step it is preferred to recycle some of the final product. To accomplish this the filtrate from the second filtration (fourth step) is conducted to a plural stage evaporator to produce a concentration of salts roughly between 48 and 55% but preferably about 52%. This concentrated solution is then mixed with some of the final product, or with polyphosphate of the same type and the mixture is calcined.

During the calcination a temperature between 250° and 500° C. may be employed but a temperature of 300° C. is adequate to complete the treatment in about an hour, and these conditions are satisfactory. One does not depart from the scope of the invention by employing other methods of drying. It is possible, for example, to evaporate the 48–55% solution to dryness in an atomizer, then to calcine the residue in a calcinator. Sometimes the dried product is humidified, after atomization and before calcination, with advantage.

If the liquors have been concentrated as aforesaid they are still fluid and can be filtered, and it is sometimes advantageous to introduce filtration to remove solid impurities which are precipitated during the concentration and before the calcination. This step is useful, or not, depending upon the purity desired in the final product.

After leaving the calcinator the product can be cooled and broken up for sale or storage.

According to one modification of the process the initial reaction may be carried out on a solution of phosphoric acid which is impure, for example upon phosphoric acid which has been produced by the wet process. Such acid normally contains a substantial quantity of fluorine which was precipitated, during the first step of the process, as sodium fluosilicates. These are separated out with calcium sulphate during the second step of the process. It is consequently advantageous, during the first step, to introduce into the reaction mass enough sodium sulphate to precipitate the fluorine and to separate the fluosilicate formed before adding the potassium sulphate.

According to another variant of the process the sulphate ions present in the solution which issues from the first filter are removed by adding enough of a barium salt, for instance barium carbonate, to precipitate these residual sulphates as barium sulphate. These may be filtered off before the sodium sulphate is added, or they may remain in the solution which is undergoing sodium carbonate reaction.

The following examples illustrate the process without detracting from the generality of what is elsewhere herein stated and claimed:

Example 1.—Continuous preparation of (Na, K) tripolyphosphate approximating $Na_{3.5}K_{1.5}P_3O_{10}$ A vat of 60 m.³ provided with agitation receives 10 m.³/hr. of defluorinated phosphoric acid solution having 30% by weight of $P_2O_5$, 2 metric tons/hr. of crushed Moroccan phosphate and 3 tons/hr. of anhydrous potassium sulphate. The mixture is maintained at a temperature of about 50° C. by bubbling air through it. Reacted parts of the mass are removed at the same rate as the reactants are admitted. The product of the vat is conducted to a continuous filter of drum type and after filtration the cake is washed with water and the water is added to the filtrate. The cake is principally calcium sulphate. The filtrate is admitted to a vat of 10 m.³ to which there is added 1.65 metric tons/hr. of anhydrous sodium carbonate. The ratio $$\frac{K+Na}{P}$$

is about 1 and the mass is maintained at about 70° C. by means of a steam coil. The sludge overflows into another vat of 10 m.³ which is maintained at the same temperature and receives 2.25 tons/hr. of anhydrous sodium carbonate.

The sludge flows out of the second of these vats onto a continuous filter of suction type so as to separate out the solid impurities. These are principally compounds of calcium, iron, aluminum, and magnesium which are derived from the phosphatic raw material. The filter cake is washed with water and the effluent is returned to the first of the 10 m.³ vats.

The filtrate from the second filtration is evaporated to a content of 52% by weight of salts, this concentrated solution is mixed with a substantial quantity of recycled final product, and this mixture is calcined in a rotary tube which is heated directly to a temperature which produces about 300° C. in the product at the point of discharge. In this way about 8 tons/hr. of (Na, K) polyphosphate are withdrawn for cooling and breaking and the rest is recycled as aforesaid.

Example 2.—Continuous preparation of (Na, K) tripolyphosphate approximating $Na_{2.5}K_{2.5}P_3O_{10}$ Substantially the same conditions are used as in Example 1, the substantial difference being that the first stage of neutralization which occurs in the first 10 m.³ vat, receives 1.4 tons/hr. of anhydrous potassium carbonate and 0.5 ton/hr. of anhydrous sodium carbonate. This produces about 8.25 tons/hr. of mixed (Na, K) tripolyphosphate in which the molar content of the two alkali metals is approximately equal.

Example 3.—Continuous preparation of (Na, K) tripolyphosphate approximating $Na_{1.5}K_{3.5}P_3O_{10}$ The conditions of Example 1 are used with this difference, that the first stage of neutralization in the first 10 m.³ vat is carried out by 2.2 tons/hr. of anhydrous potassium carbonate and the second stage of neutralization is carried out in the second of these vats by 0.65 ton/hr. of anhydrous potassium carbonate and 1.7 tons/hr. of anhydrous sodium carbonate. This produces about 8.5 tons/hr. of mixed (Na, K) tripolyphosphate approximating $Na_{1.5}K_{3.5}P_3O_{10}$.

Example 4.—Continuous preparation of (Na, K) pyrophosphate approximating $Na_2K_2P_2O_7$ The general operating conditions of Example 1 are employed with the difference that the first stage, a partial neutralization in the first 10 m.³ vat is carried out by 3.5 tons/hr. of a solution of potassium hydroxide containing 50% KOH by weight, and the second stage, in the second 10 m.³ vat by a solution of caustic soda containing 50% NaOH by weight. It produces about 9 tons/hr. of (Na, K) pyrophosphate approximating $Na_2K_2P_2O_7$.

Example 5.—Manufacture of a batch of (Na, K) tripolyphosphate approximating $Na_{2.5}K_{2.5}P_3O_{10}$ A vat of 150 m.³ capacity, provided with agitators, receives 120 m.³ of defluorinated phosphoric acid solution containing 30% $P_2O_5$ at 50° C.; 8 tons of crushed Moroccan phosphate are added during one hour, and in the succeeding hour 10 tons of anhydrous potassium sulphate are added. After 6 hours of reaction the sludge is filtered through a battery of filter presses and the filtered cakes are washed, the wash water being added to the filtrate, which is stored. A plurality of these operations can be carried out in a single day.

About ⅓ of the filtrate is removed from storage and put into a vat of 70 m.³ capacity, to which there are successively added 10.5 tons of potassium carbonate and 10 tons of sodium carbonate. The mass is heated progressively to 70° C. and at the end of the operation is brought to the boil by means of a steam coil. The resulting reaction mass is filtered through a filter press. The entire operation requires about 4 hours; about 6 reactions of this type can be carried out in this apparatus per day. The filtered liquid is concentrated to about 50% of salts by weight, it is filtered through a press and sent to intermediate storage. The liquor may be evaporated to dryness in an atomizer. The product produced is calcined at 400° C. By this means an average of 180 tons/day of (Na, K) tripolyphosphate approximating $Na_{2.5}K_{2.5}P_3O_{10}$ may be produced.

The process of the invention has significant advantages over the prior art: It permits one to use raw materials which are particularly advantageous, for example natural phosphate, potassium sulphate, impure solutions of phosphoric acid, and dilute solutions of phosphoric acid; the process may be continuous, and it has no problems of corrosion or of purification; it requires no special apparatus. The products are valuable because they have low hygroscopicity but easily enter into solution. The solutions obtained are particularly stable and the increased solubility of these salts has enabled them to be used in fields from which they were previously excluded, particularly as leaching solutions and complexants.

As many apparently widely different embodiments of the present invention may be made without departing from the spirit and scope thereof, it is to be understood that the invention is not limited to the specific embodiments.

What is claimed is:

1. A method of making complex sodium and potassium $(Na\ K)_n$ polyphosphates in which *n* is from about 4 to about 7 which comprises reacting phosphate of fertilizer grade in aqueous medium with phosphoric acid and potassium sulphate, separating the precipitate from the liquid, reacting the liquid with an oxygenated sodium compound in proportions producing a proportion of K ions to total alkali metal ions circa 0.3 to 0.7, separating the precipitate from the liquid, concentrating the liquid, mixing the concentrated liquid with final product, and calcining the mixture.

2. A method according to claim 1 in which the reaction with potassium sulphate is at about 35°–55° C., wherein the oxygenated sodium compound is sodium carbonate, the reaction with sodium carbonate is at about 50°–100° C., the calcination is at about 250°–500° C., and the filtrate is concentrated to about 48–55% solids by weight before calcination.

3. A process of preparing (Na, K) polyphosphate having the general formula $(Na,K)_{x+2}P_xO_{3x+}$, *x* being at least equal to 2, and the ratio of K to K+Na being between about 0.3 and about 0.7 which comprises mixing phosphate material containing calcium phosphate with a solution of phosphoric acid and a sulphate of an alkali metal (selected from the group consisting of Na and K, in water, the quantity of alkali metal sulphate being sufficient to form the calcium of the calcium phosphate into insoluble calcium sulfate and to produce a solution of the alkali metal phasphate and phosphoric acid, separating out the solid material present, then partially neutralizing the solution by an oxygenated alkali metal compound chosen from the group consisting of the oxides, hydroxides, carbonates, and bicarbonates of Na and K, provided that if potassium sulfate is selected for the first step, a sodium compound will be included in the second, and if sodium sulphate is selected for the first step, a potassium compound will be included in the second step, the partial neutralization satisfying a ratio of total alkali metal ions to the phosphorous atoms present of $$\frac{x+2}{x}$$

*x* being at least 2, and the ratio of K to total alkali being between 0.3 and about 0.7 concentrating the partially neutralized solution, and calcining the concentrated solution to convert the mixture of phosphoric acid, Na phosphate and K phosphate to a composition comprising a polyphosphate corresponding to said formula.

4. The method of claim 3 in which the oxygenated alkali metal compound is the carbonate.

5. The method according to claim 3 in which the second reaction is with sodium carbonate and occurs in a plurality of successive steps, a portion of the sodium carbonate being added to and reacted with the liquid in each step, the molar ratio $$\frac{Na+K}{P}$$

being first between the range 1–1.2 and thereafter in the neighborhood of $$\frac{x+2}{x}$$

6. The method according to claim 3 in which the filtrate from the second of said separations is returned to the step in which sodium carbonate is reacted with the liquid from the first separation, and the calcination is carried out in admixture with recycled final product.

7. The method of claim 3 in which the total K ions introduced establish a ratio $K_2O/P_2O_5$ less than 0.5.

8. The method of claim 3 in which the reaction mass of acid and phosphate receives enough sodium sulphate to precipitate fluorine compounds as sodium fluosilicate, and these fluor precipitates are removed before the addition of the potassium sulphate.

References Cited

UNITED STATES PATENTS

| | | | |
|---|---|---|---|
| 2,511,249 | 6/1950 | C.B. Durgin et al. | 23—106 |
| 2,288,418 | 6/1942 | E. P. Partridge | 23—106 |
| 2,296,716 | 9/1942 | F. C. Jelen | 23—106 |

FOREIGN PATENTS

| | | |
|---|---|---|
| 622,986 | 6/1961 | Canada. |

OTHER REFERENCES

Chemical Abstracts, 51, 1762 (F), 1957.

Van Wazer: Vol. I, Phosphorus and its Compounds, pages 609 and 684 (1958).

OSCAR R. VERTIZ, Primary Examiner

A. GREIF, Assistant Examiner